(12) United States Patent
Komiya

(10) Patent No.: US 8,634,109 B2
(45) Date of Patent: Jan. 21, 2014

(54) IMAGE FORMING APPARATUS, AND CONTROL METHOD AND CONTROL PROGRAM THEREOF

(75) Inventor: Yoshiyuki Komiya, Abiko (JP)

(73) Assignee: Canon Kabushiki Kaisha (JP)

( * ) Notice: Subject to any disclaimer, the term of this patent is extended or adjusted under 35 U.S.C. 154(b) by 820 days.

(21) Appl. No.: 12/185,956

(22) Filed: Aug. 5, 2008

(65) Prior Publication Data

US 2009/0041489 A1 Feb. 12, 2009

(30) Foreign Application Priority Data

Aug. 8, 2007 (JP) ................................. 2007-207179

(51) Int. Cl.
*G03G 15/043* (2006.01)

(52) U.S. Cl.
USPC ............. 358/3.26; 358/1.9; 358/300; 399/44; 399/51; 399/69; 347/115

(58) Field of Classification Search
USPC ............... 358/1.9, 3.01, 3.23, 3.27, 463, 515, 358/3.26, 300; 382/162; 347/115, 116; 399/38, 48, 44, 72, 51, 69
See application file for complete search history.

(56) References Cited

U.S. PATENT DOCUMENTS

| | | | |
|---|---|---|---|
| 5,465,157 A * | 11/1995 | Seto et al. ..................... | 358/3.15 |
| 5,537,515 A * | 7/1996 | Yokoyama et al. ............ | 358/1.9 |
| 5,581,358 A | 12/1996 | Seto et al. | |
| 5,608,495 A * | 3/1997 | Kitakubo et al. ............... | 399/72 |
| 5,767,982 A * | 6/1998 | Takahashi et al. ............ | 358/300 |
| 7,598,971 B2 | 10/2009 | Tezuka et al. | |
| 2006/0177232 A1 * | 8/2006 | Ehara et al. ..................... | 399/44 |
| 2006/0290767 A1 * | 12/2006 | Tezuka et al. .................. | 347/115 |
| 2007/0077078 A1 * | 4/2007 | Karasawa et al. ............... | 399/38 |
| 2008/0304108 A1 | 12/2008 | Kimura | |

FOREIGN PATENT DOCUMENTS

| | | |
|---|---|---|
| CN | 1885189 A | 12/2006 |
| JP | 4-163564 A | 6/1992 |
| JP | 4-360375 A | 12/1992 |
| JP | 6-284289 A | 10/1994 |

(Continued)

OTHER PUBLICATIONS

Notification of the First Office Action issued in corresponding Chinese Patent Application No. 200810145336.1 dated May 19, 2010.

(Continued)

*Primary Examiner* — Allen H Nguyen
(74) *Attorney, Agent, or Firm* — Rossi, Kimms & McDowell LLP

(57) ABSTRACT

An image forming apparatus has an image carrier carrying an electrostatic latent image, a charging unit charging the surface of the image carrier, an exposure unit forming an electrostatic latent image by irradiating light onto the charged surface of the image carrier, a developing unit developing the electrostatic latent image formed on the surface of the image carrier using a developing material, and a transfer unit transferring a developer image onto a printing material. The apparatus has also an image correction unit correcting image data inputted to the exposure unit so as to compensate for deformation in the developer image originating in a form of the exposure unit, and a smoothing processing unit carrying out smoothing of an image by controlling the exposure unit so that dots of a size smaller than one pixel are filled with respect to a white image region of the corrected image data.

6 Claims, 13 Drawing Sheets

(56) References Cited

FOREIGN PATENT DOCUMENTS

| | | |
|---|---|---|
| JP | 7-009695 A | 1/1995 |
| JP | 8-160681 A | 6/1996 |
| JP | 8-161681 A | 6/1996 |
| JP | 2004-017552 A | 1/2004 |
| JP | 2004-114303 A | 4/2004 |
| JP | 2004-170755 A | 6/2004 |
| JP | 2006-289749 A | 10/2006 |
| JP | 2006-297634 A | 11/2006 |
| JP | 2006-326913 A | 12/2006 |
| JP | 2007-144740 A | 6/2007 |

OTHER PUBLICATIONS

Japanese Office Action for corresponding JP 2007-207179, mail date Apr. 27, 2012.

Japanese Office Action issued in Japanese counterpart application No. JP2007-207179, dated Dec. 17, 2012.

* cited by examiner

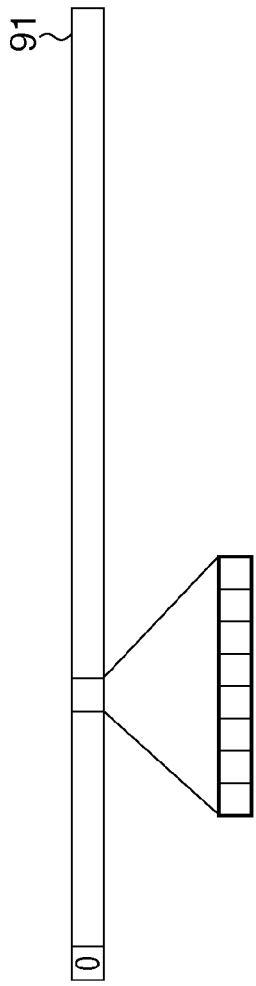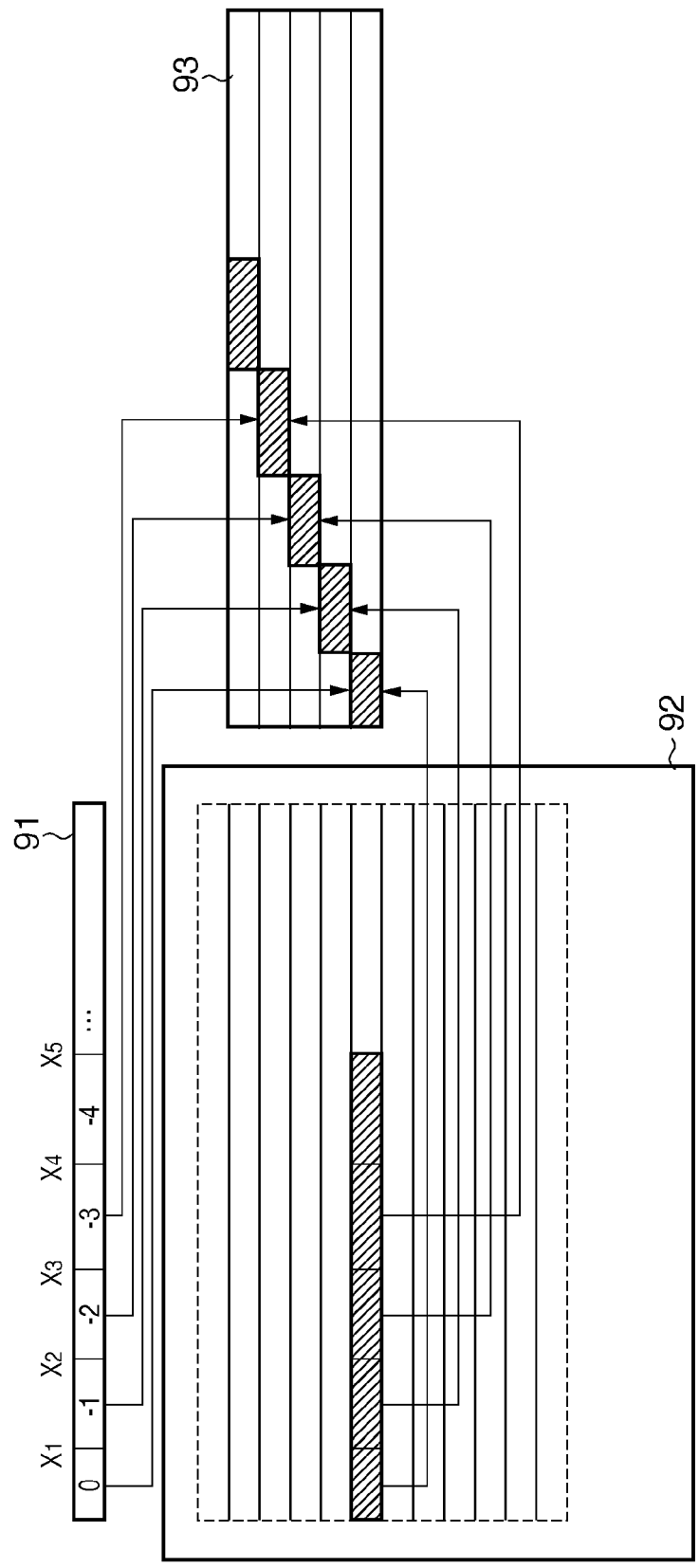
FIG. 9A
FIG. 9B

F I G. 13
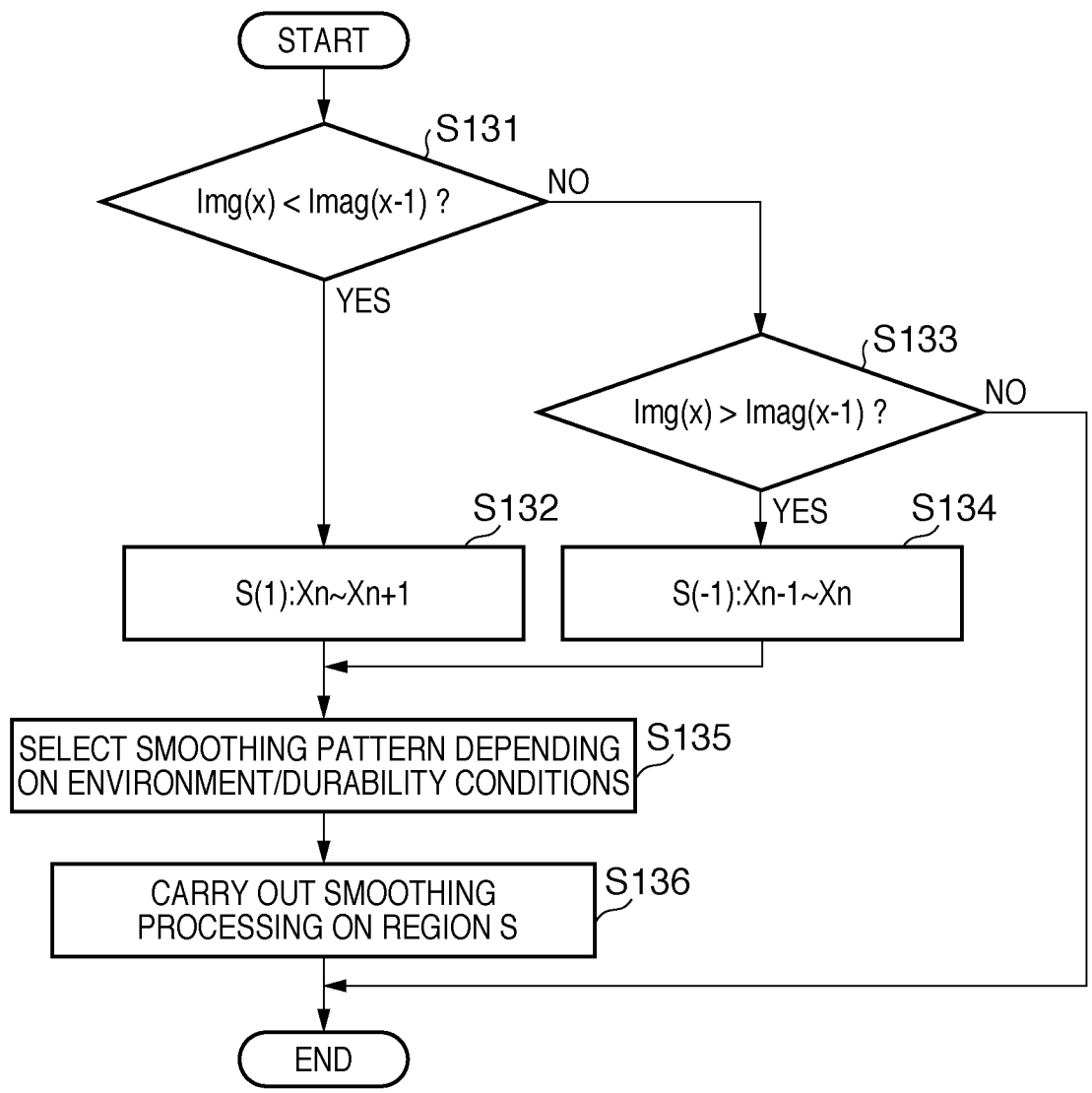

IMAGE FORMING APPARATUS, AND CONTROL METHOD AND CONTROL PROGRAM THEREOF

BACKGROUND OF THE INVENTION

1. Field of the Invention

The present invention relates to image forming apparatuses, and control methods and control programs thereof.

2. Description of the Related Art

Hitherto, image forming apparatuses have been used in which image forming is carried out by irradiating a laser light onto a photosensitive drum. When using a laser optical system in this manner, due to causes such as error in mechanical precision of optical components or fitting during assembly and installation for example, there are some problems. For example, the start position of the scanning line of the laser light scanned on the photosensitive drum was displaced. Furthermore, a desired magnification ratio may not be achieved, the scanning line may be tilted, curved, or distorted on the photosensitive drum. In regard to writing position and magnification ratio corrections among these, techniques have hitherto been employed involving detecting error and performing corrections electrically. However, since electrical corrections of this manner are difficult for tilt or warp in a scanning line, conventionally corrections have been carried out using high quality optical components so that tilt and warp are not produced. Thus, an apparatus having an expensive configuration is necessitated and moreover precise fine adjustments are necessary during assembly, which leads to increased man-hour, thereby resulting in higher production costs.

In regard to these issues, Japanese Patent Laid-Open No. 2004-170755 (page 13, FIG. 1) proposes a method in which registration is detected at a plurality of points in at least three or more locations in a main scanning direction, and the image data is changed so as to correct warp such as tilt or curving in the main scanning direction, which has been calculated from the detected registration. Here, in relation also to corrections of one pixel or less in the sub-scanning direction, writing positions are detected from a result of detecting registration in a same manner, and the image data is changed so as to correct the sub-scanning direction writing positions that have been detected. By performing image forming with image data that has been changed in this manner, positional corrections can be carried out on tilt or warp in the scanning line without using expensive optical components or performing precise adjustment processes, thereby enabling a high image quality image forming apparatus to be provided at low cost.

Unfortunately, in a case of a configuration indicated in the aforementioned patent document, it is necessary to provide a plurality of registration detection unit for at least three locations in the main scanning direction, and thus there is a problem in that the apparatus itself greatly increases in cost.

Moreover, although correction is carried out on the image data by deriving tilt/warp in the scanning line from a result of detecting the registration pattern, there are cases where the correction positions are roughly detected in the main scanning direction depending on the form of the tilt and warp in the scanning line, and corrections cannot be carried out optimally.

SUMMARY OF THE INVENTION

The present invention achieves high quality image forming without carrying out corrections using expensive optical components or precise fine adjustments at the time of assembly even if there is the tilt or warp or the like of scanning lines of an optical system.

One aspect of the present invention provides an image forming apparatus having an image carrier that carries on a surface an electrostatic latent image corresponding to image data, a charging unit configured to charge the surface of the image carrier, an exposure unit configured to form an electrostatic latent image by irradiating light corresponding to image data onto the charged surface of the image carrier, a developing unit configured to develop the electrostatic latent image formed on the surface of the image carrier using a developing material, and a transfer unit configured to transfer a developer image formed on the surface of the image carrier onto a printing material, wherein the image forming apparatus comprises an image correction unit configured to correct image data inputted to the exposure unit so as to compensate for deformation in the developer image originating in a form of the exposure unit, and a smoothing processing unit configured to carry out smoothing of an image by controlling the exposure unit so that dots of a size smaller than one pixel are filled with respect to a white image region (non-imaged region) of the image data corrected by the image correction unit.

Another aspect of the present invention provides a control method of an image forming apparatus, the image forming apparatus having an image carrier that carries on a surface an electrostatic latent image corresponding to image data, a charging unit configured to charge the surface of the image carrier, an exposure unit configured to form an electrostatic latent image by irradiating light corresponding to image data onto the charged surface of the image carrier, a developing unit configured to develop the electrostatic latent image formed on the surface of the image carrier using a developing material, and a transfer unit configured to transfer a developer image formed on the surface of the image carrier onto a printing material, the control method of the image forming apparatus comprises image correcting in which image data inputted to the exposure unit is corrected so as to compensate for deformation in the developer image originating in a form of the exposure unit, and smoothing processing in which smoothing of an image is carried out by controlling the exposure unit so that dots of a size smaller than one pixel are filled with respect to a white image region of the image data corrected by the image correcting.

Further features of the present invention will be apparent from the following description of exemplary embodiments with reference to the attached drawings.

BRIEF DESCRIPTION OF THE DRAWINGS

FIG. 9A is a diagram showing a configuration of a buffer memory used in first correction.

FIG. 9B is an outline diagram showing the first correction.

FIG. 13 is an outline diagram showing second correction according to a second embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Apparatus Configuration

Figure 1:
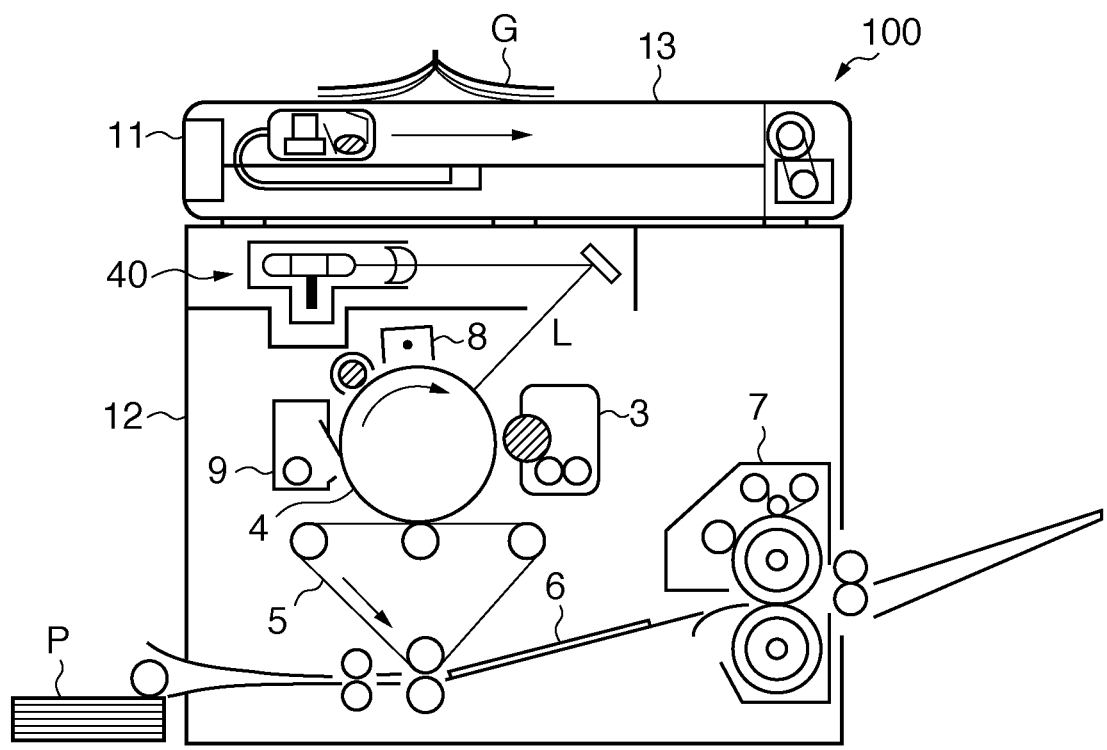
FIG. 1 is an outline cross-sectional view of an image forming apparatus as a first embodiment of the present invention.
Figure 2:
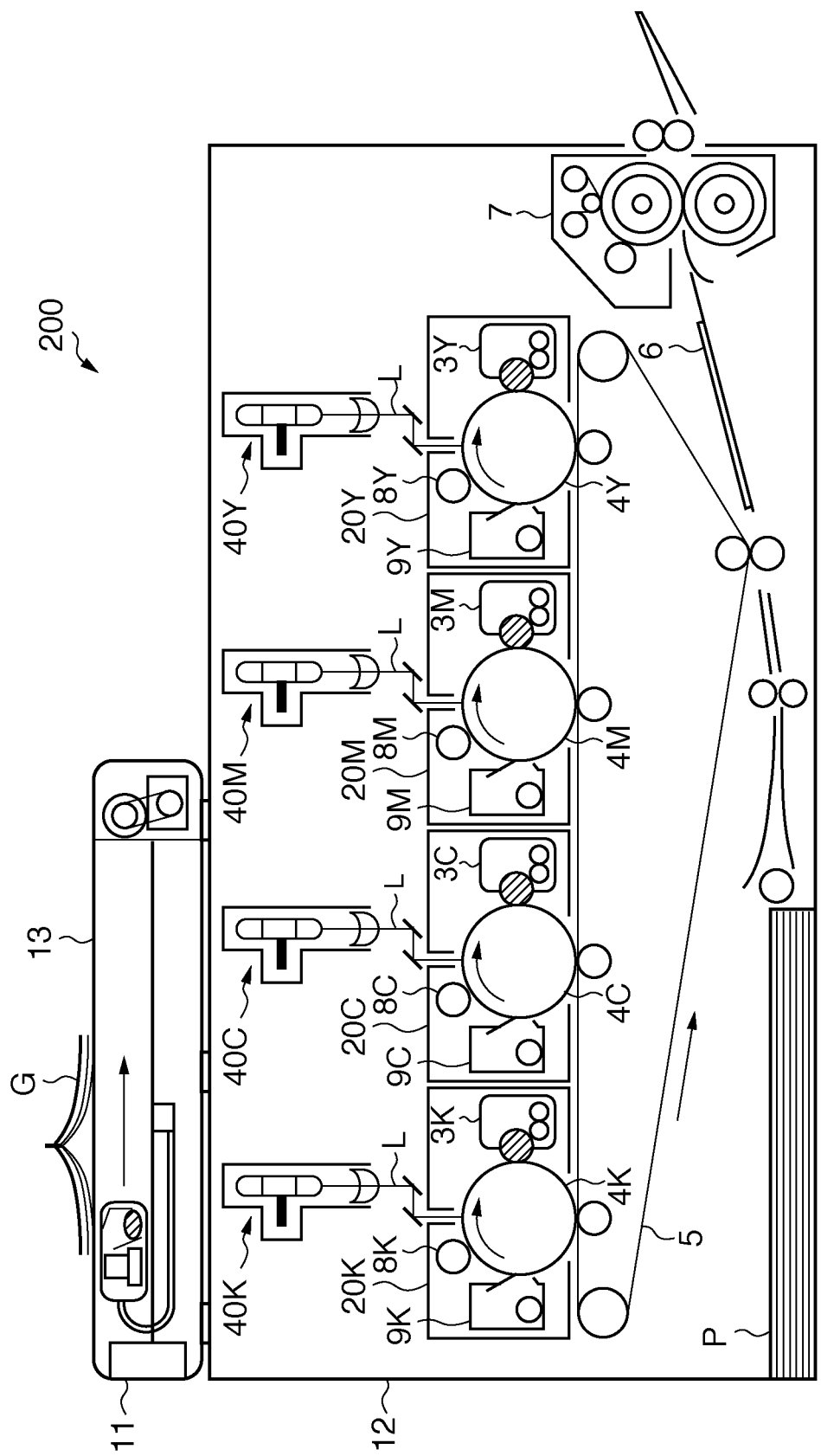
FIG. 2 is an outline cross-sectional view of an image forming apparatus as the first embodiment of the present invention.

Description is given regarding two types of copiers 100 and 200 shown in FIG. 1 and FIG. 2 as examples of image forming apparatuses to which the present invention can be applied. FIGS. 1 and 2 are diagrams showing internal configurations of the copiers 100 and 200 of a first embodiment. It should be noted that image forming apparatuses according to the present invention are not limited to these copiers, and the present invention can also be applied to printers and facsimile machines, or multi-function peripherals having a combination of these functions.

In a reader unit 11 in the copier 100 shown in FIG. 1, an original G placed on an original stage glass 13 is irradiated by a light source, and reflected light thereof forms an image on a CCD sensor via an optical system. The CCD sensor generates red, green, and blue component signals with each line sensor in a CCD line sensor group in which red, green, and blue line sensors are arranged in three rows. These reading optical system units convert the original into electrical signal data rows for each line by scanning in a direction shown by the arrow. The image signals obtained by the CCD sensor are sent to a printer unit 12 as image data after undergoing image processing in an unshown reader image processing unit.

In the printer unit 12, a photosensitive drum 4 rotates as shown by an arrow at a predetermined angular velocity as an image carrier for carrying on a surface thereof an electrostatic latent image corresponding to the image data. Also, the surface of the photosensitive drum 4 is uniformly charged by a charger 8 as a charging unit. Then the electrostatic latent image is formed on the photosensitive drum 4 in accordance with the image data by exposing and scanning a laser beam L using an exposure device 40 as an exposure unit in which on/off control is performed in response to the image data from the reader unit 11. As a developing unit, a developer 3 forms a developer image by causing toner, which is a developing material, to be supplied to the electrostatic latent image that has been formed on the surface of the photosensitive drum 4. The toner image, which is now visible, is transferred onto an intermediate transfer member 5 as a transfer unit that rotationally drives while pressing against the photosensitive drum 4 with a predetermined suppressing force. After this, the toner image is transferred to a printing material 6 that has been fed from a feeding unit and the transferred toner image on the printing material 6 undergoes a fixing process by a fixing unit 7, then the recording material 6 is discharged outside the apparatus.

The copier 200 shown in FIG. 2 is a tandem-type image forming apparatus and, unlike the copier 100 shown in FIG. 1, is configured having process cartridges 20Y, 20M, 20C, and 20K corresponding to each color lined up. Other than the point of having a plurality of process cartridges, it has the same configuration as the copier 100 shown in FIG. 1, and therefore same symbols are applied to same structural elements and description thereof is omitted.

Chargers 8Y, 8M, 8C, and 8K contained in the process cartridges 20Y to 20K are roller chargers and uniformly charge to a negative polarity the surfaces of respective photosensitive drums 4Y, 4M, 4C, and 4K by applying a bias. The image data is converted to laser lights via laser drivers and laser light sources contained in the exposure device 40 as an exposure unit, and the laser lights are reflected using polygonal mirrors, thereby irradiating onto the uniformly charged photosensitive drums 4Y to 4K. The photosensitive drums 4Y to 4K, on which latent images have been formed by laser light scanning, rotate in a direction shown by the arrows in the diagram.

A yellow toner developer 3Y, a magenta toner developer 3M, a cyan toner developer 3C, and a black toner developer 3K are arranged in the process cartridges 20Y to 20K respectively.

Here, specific description is given of an image forming process using the process cartridge 20Y as an example. The surface of the photosensitive drum 4Y of the process cartridge 20Y is uniformly charged by the charger 8Y (for example, −500 V in the present embodiment). Next, exposure and scanning is performed by the exposure device 40Y in which on/off control is performed in response to image data of a first color, and a first color electrostatic latent image is formed on the photosensitive drum 4Y (approximately −150V in the present embodiment). The first color electrostatic latent image is developed and made visible by the yellow developer 3Y, which contains first color yellow toner (negative polarity). The first toner image, which has been made visible, undergoes primary transfer onto an intermediate transfer member 5 at a nip unit between the photosensitive drum 4Y and the intermediate transfer member 5, which is pressed against the photosensitive drum 4Y and is rotationally driven at a velocity substantially equivalent to a peripheral velocity of the photosensitive drum 4Y. Toner that remains on the photosensitive drum 4Y without being transferred to the intermediate transfer member 5 during primary transfer is scraped off by a cleaning blade 9Y that presses against the photosensitive drum 4Y and is collected in a waste toner receptacle (not shown).

The same processing as above is carried out by the other process cartridges 20M, 20C, and 20K also, then after toner images of different color toners from each of the process cartridges are successively transferred and layered onto the intermediate transfer member 5, they undergo secondary transfer together onto a printing material 6 that is fed from the feeding unit. After this transfer the printing material 6 is discharged outside the apparatus by way of a fixing process by the fixing unit 7 to become a full color print.

Figure 3:
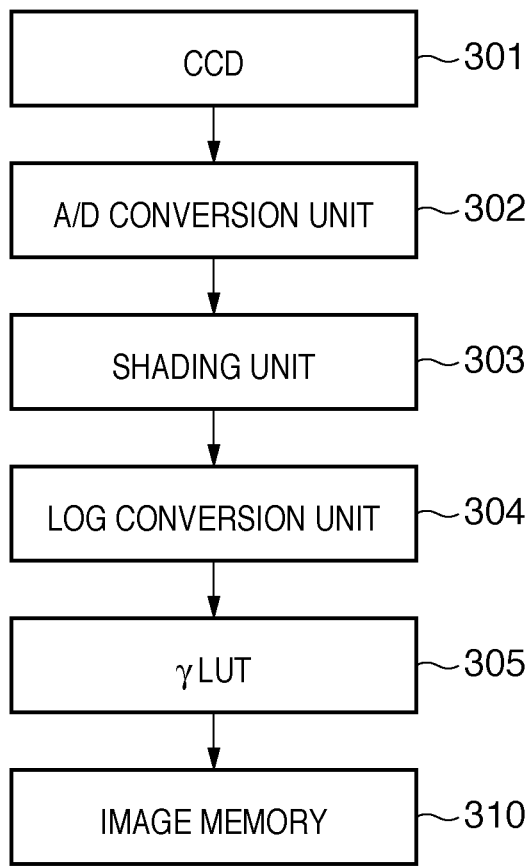
FIG. 3 is a flowchart relating to image signal processing units according to the first embodiment.

FIG. 3 is a diagram for describing an internal configuration of an image processing unit contained in the reader unit 11. Luminance signals of the original image that have been read by a CCD 301 are inputted to an A/D conversion unit 302 and converted to digital signals. The digital luminance signals are sent to a shading unit 303 and light power discrepancies due to unevenness in the sensitivity of the CCD elements undergo shading correction. The measurement reproducibility of the CCD is improved by performing shading correction. The luminance signals that have been corrected by the shading unit 303 further undergo log conversion by a log conversion unit 304. Following this, the log converted signals are sent to a gamma LUT 305 and undergo conversion by the gamma LUT 305, which has been created so as to match the density characteristics that are ideal for the printer apparatus and the density characteristics of the image to be outputted, which has been processed in accordance with gamma characteristics. The image signals that have been converted in this manner are sent to and stored in an image memory 310 of the printer unit 12.

Figure 4:
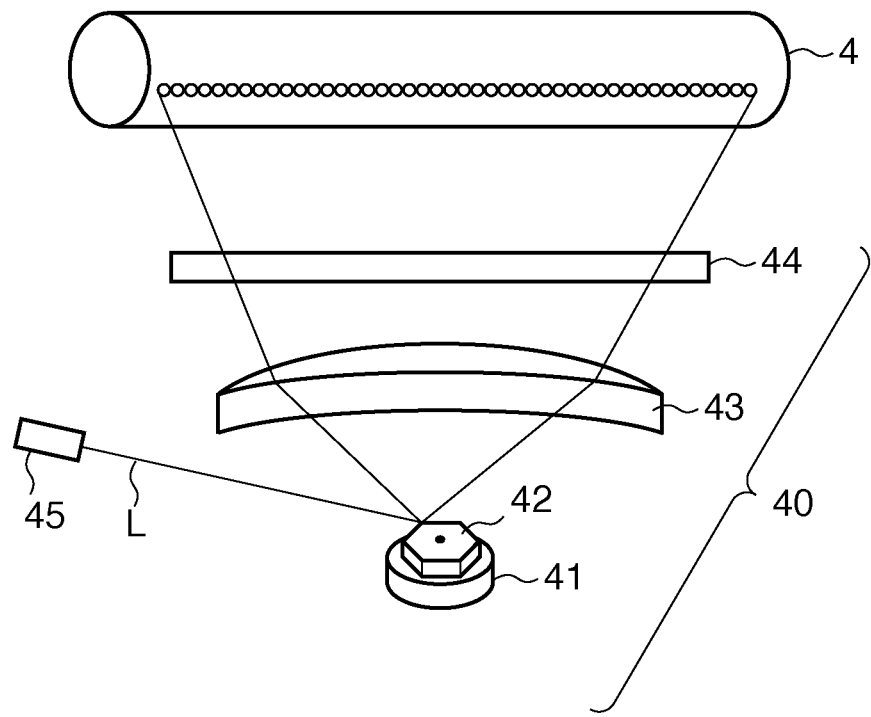
FIG. 4 is a schematic diagram of a laser optical system according to conventional technology.
Figure 5:
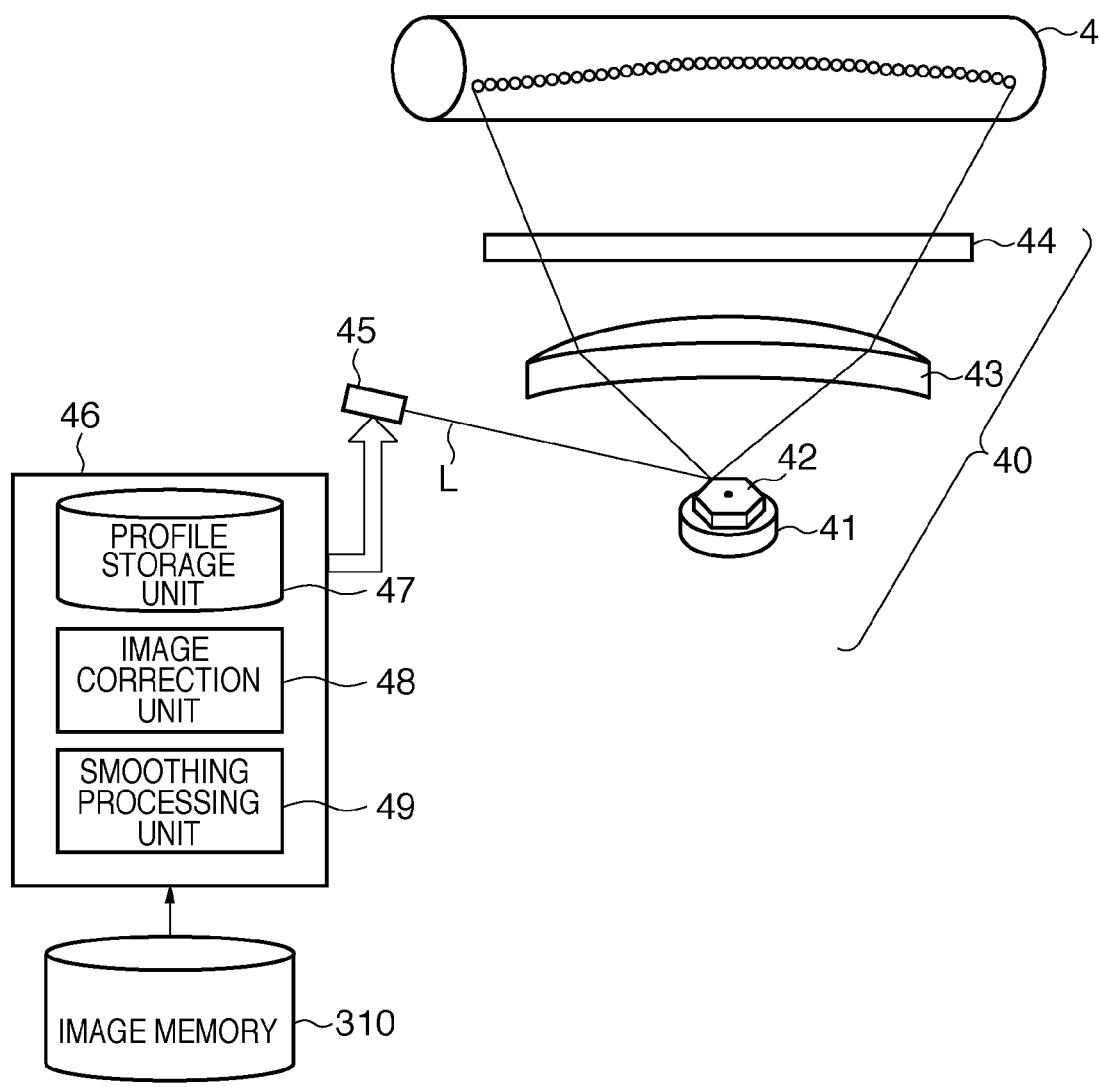
FIG. 5 is a schematic diagram of a laser optical system according to the first embodiment.

Description is given regarding an exposure device 40 according to the present embodiment using FIGS. 4 and 5. The exposure device 40 includes a laser driving unit 45, a rotating polygonal mirror motor 41, a rotating polygonal mirror 42, an optical system f-theta lens 43, and a reflector mirror 44. A laser L irradiated from the laser driving unit 45 is reflected by reflection planes of the rotating polygonal mirror 42, which is installed on the rotating polygonal mirror motor 41, then passes through the optical system f-theta lens 43 so as to achieve a constant linear velocity at an exposure surface, then is further reflected by the reflector mirror 44 and reaches the photosensitive drum 4. At this time, it is preferable that the trajectory of the reflected laser L describes an ideal straight line as shown in FIG. 4.

However, structural components of the exposure device 40 that have been installed without carrying out any particular adjustments possess an intrinsic tilt and warp or the like, and when exposure operations are carried out in that state the scanning lines do not describe an ideal straight line as shown in FIG. 4. That is, the scanning lines that are exposed are scanned on the photosensitive drum 4 being influenced by the intrinsic tilt or warp as shown in FIG. 5. Conventionally, in order to carry out scanning without producing this tilt or warp in the exposed scanning lines on the photosensitive drum 4, expensive optical components have been used when assembling the exposure device 40 or precise fine adjustments have been carried out on the apparatus itself. With the present embodiment, an image processing unit 46 is provided for achieving excellent image quality at low cost by canceling the intrinsic tilt or warp of the scanning lines of the laser optical system without using expensive components or carrying out precise fine adjustments. The image processing unit 46 includes a profile storage unit 47 that stores profile data indicating the warp or tilt of the exposure device, and an image correction unit 48 as an image forming unit, which transforms inputted image data based on the stored profile data. Further still, a smoothing processing unit 49 is included as a smoothing processing unit for controlling the laser driving unit 45 so as to smooth areas of level difference contained in the transformed image data.

Correction Control

Description is given regarding a data correction process for compensating for image deformation due to design error in the form or positioning of an optical system in an image forming apparatus such as a copier. This data correction process can be thought of divided into the following five processes. (1) Measure and save a profile of an optical system including an exposure device, (2) transmit the profile data to the image forming apparatus, (3) generate first correction data from the profile data, (4) process the image data using the first correction data at the time of image forming, and (5) smoothing processing, thus, hereinafter, separate description is given regarding the aforementioned five processes.

(1) Measure Scanning Line Profile

As a first step of a data correction process for compensating for image deformation originating in the optical system, a profile of the tilt or warp that is intrinsic to the laser optical system is measured at the time of manufacturing the laser optical system.

Figure 7:
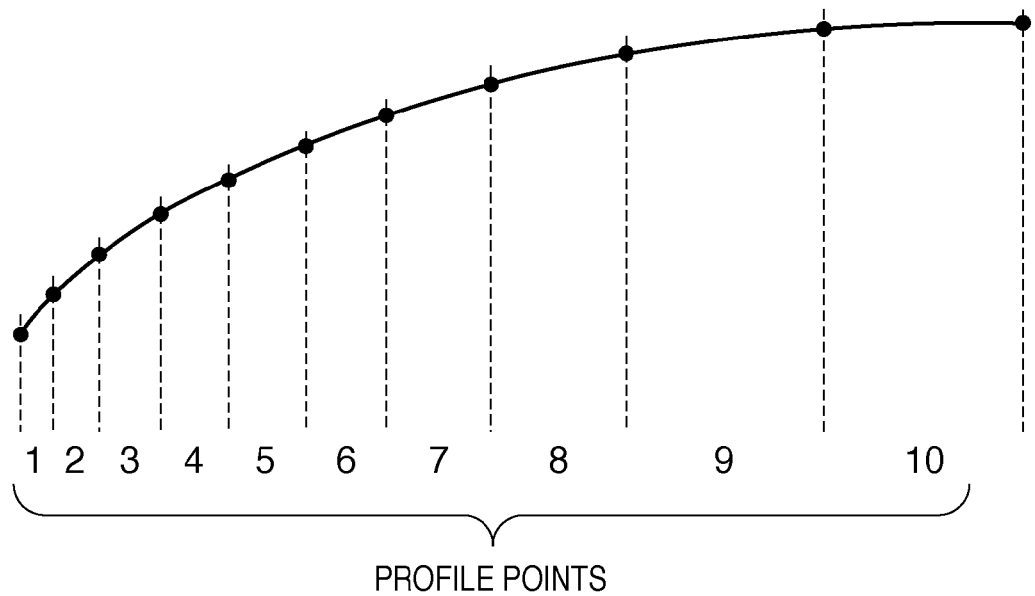
FIG. 7 is a schematic diagram showing a scanning line profile.

At this point, sub-scanning direction positions of division points when the scanning line is divided into n divisions in the main scanning direction (n is at least three or more and here n=10 as an example) are set as profile points as shown in FIG. 7.

The measured profile data is stored in a storage medium such as an EPROM provided in the laser optical system unit. Alternatively, as a simple configuration, storage and holding is performed by using a configuration in which the data is encoded as a barcode or the like and attached to the laser optical system unit itself.

(2) Transmitting the Profile Data to the Image Forming Apparatus

The stored profile data is read out from the EPROM of the laser optical system unit to the image forming apparatus main unit during assembly. Even in a case where a replacement of the laser optical system unit is carried out by a service operator at a location of a user after shipping, profile data corresponding to the laser optical system unit after replacement is stored in the profile storage unit 47 from the EPROM that is held in the unit after replacement of the unit.

Or a configuration is also possible in which an operator uses a code reader device such as a barcode reader during assembly to read the encoded barcode data and reflect this into the image forming apparatus main unit. In this case, profile data corresponding to the laser optical system unit is similarly saved in the profile storage unit 47 by the service operator reading the barcode attached to the unit to be replaced using the barcode reader or by assigning numerical values.

(3) Calculating First Correction Data

Figure 6:
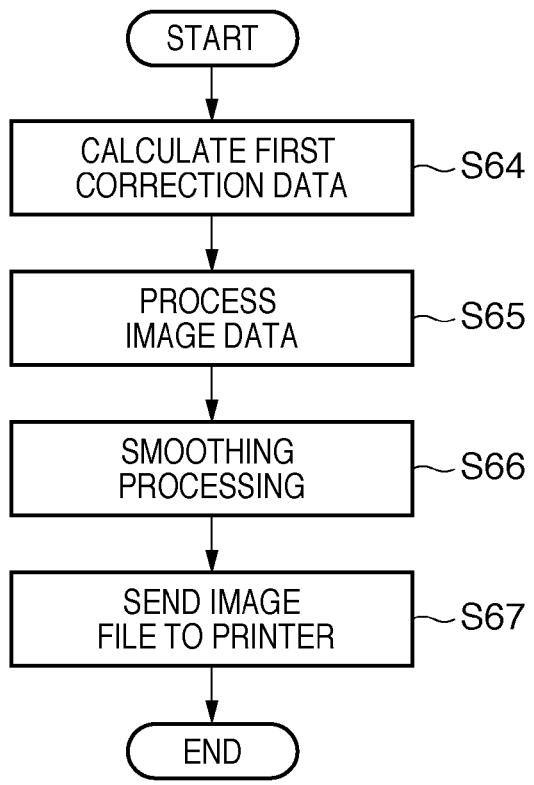
FIG. 6 is a flowchart of the first embodiment.

Description is given using FIG. 6 regarding a process in which tilt or warp in the laser optical system is corrected at a time of image forming. FIG. 6 is a flowchart for describing a flow of correction processing, and each process thereof is executed by having an unshown processor provided in the image forming apparatus execute a predetermined program.

At step S64, based on an n number of profile data of a scanning line, first correction data is calculated from an amount of displacement of each point from ideal coordinates.

Figure 8A:
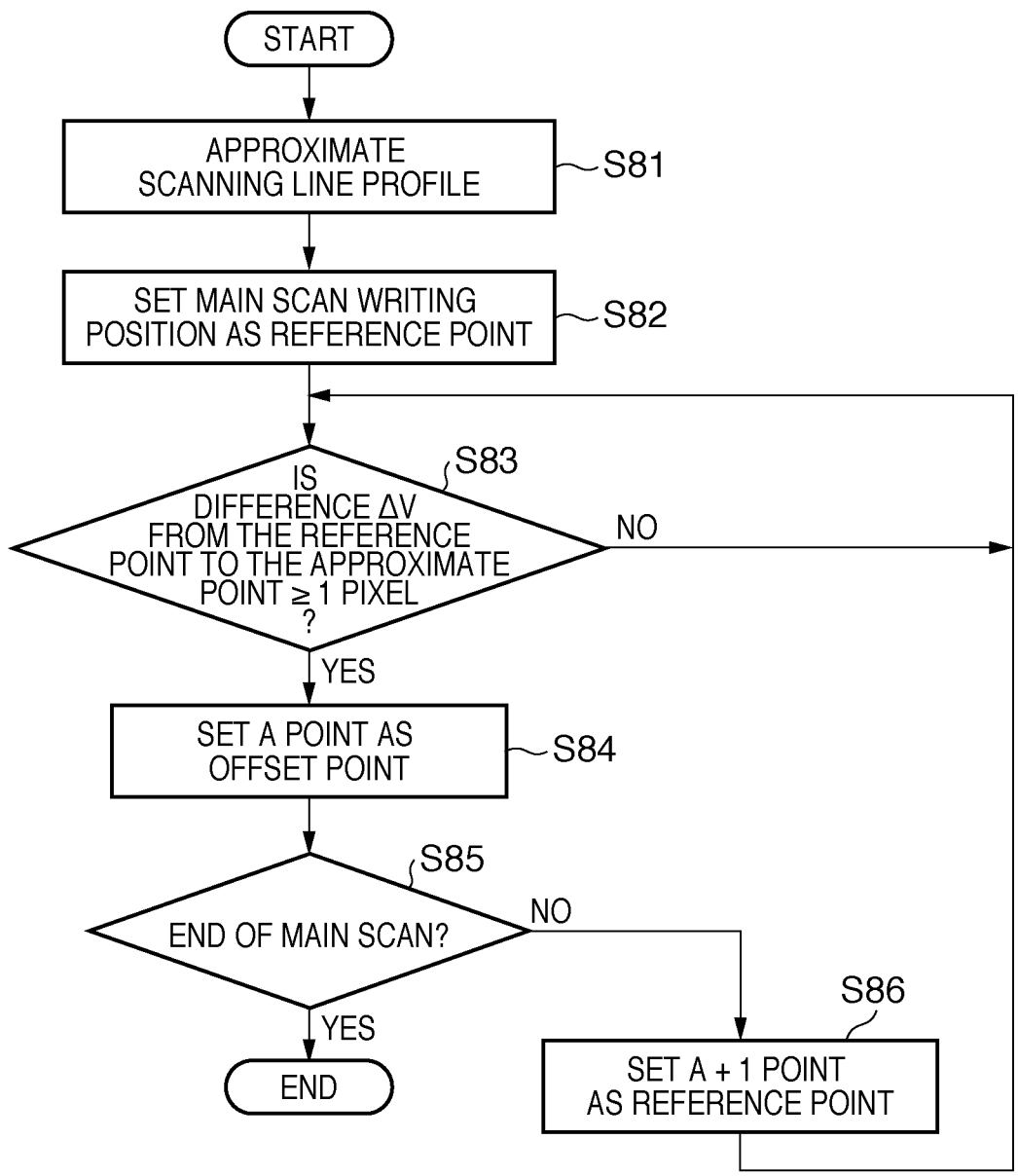
FIG. 8A is a flowchart of calculating first correction data.
Figure 8B:
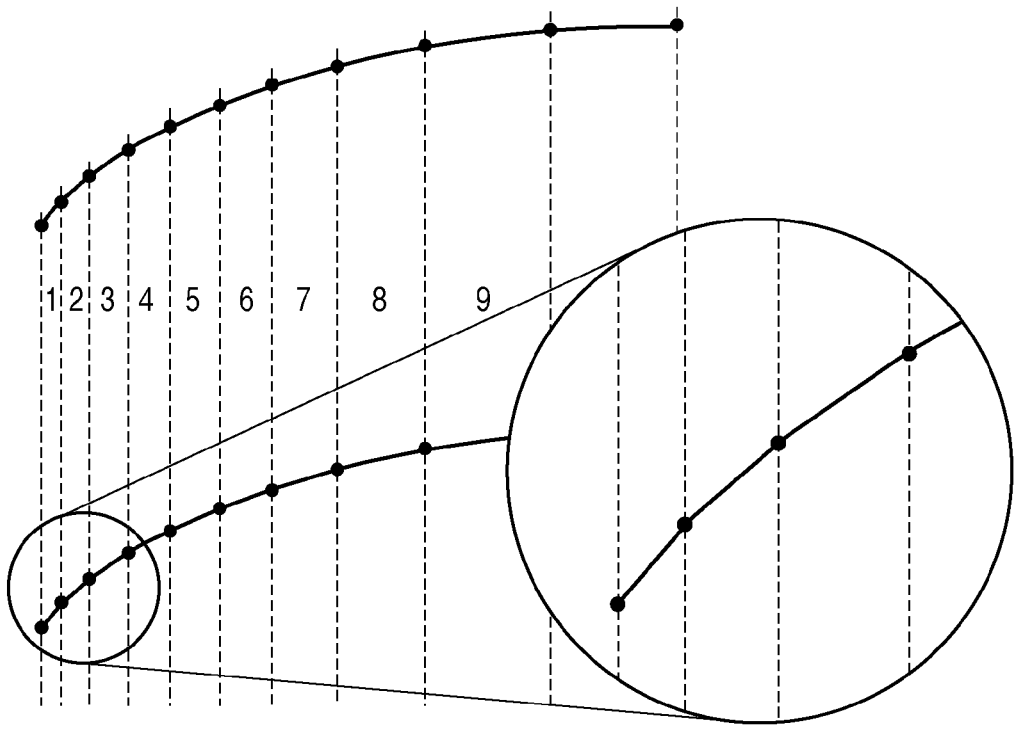
FIG. 8B is a diagram for describing an approximation process of the scanning line profile.
Figure 8C:
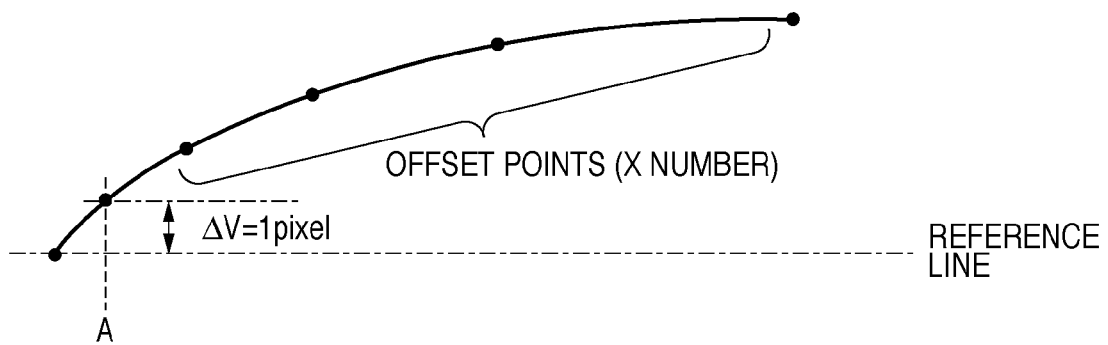
FIG. 8C is a diagram for describing a process of deriving offset points.

Here, description is given using FIGS. 8A to 8C regarding a flow of calculating the first correction data. At step S81 in FIG. 8A, first a scanning line as shown in FIG. 8B that has undergone n division into an n number of profile point data is approximated along an entire region of a main scan. Here in the present embodiment, straight line approximation is used between two adjacent points. Next, at step S82, of the approximated points of the entire region of the main scan obtained at step S81, a main scan writing position is set as a reference point.

At step S83, a check is performed on the approximated points in the main scanning direction from the reference point, and when a difference ΔV from the reference point in the sub-scanning direction exceeds one pixel, a main-scanning position of that point (A point) is set as an offset point at step S84. Next, at step S86, the A point is reset as a new reference point.

By carrying out the above-described steps S83 to S86 along the entire region of the main scan, coordinates (X number) can be obtained (FIG. 8C) of positions (offset points) for offsetting in single pixel units in the sub-scanning direction for correcting tilt or warp in the scanning line. Coordinates information of the thus-obtained X number of offset points and information of the offset amount from the reference line for the respective offset points are stored in the profile storage unit 47 as the first correction data.

(4) Processing the Image Data Using the First Correction Data at the Time of Image Forming At step S65, the image correction unit 48 carries out processing (first correction) on the inputted image data in accordance with the first correction data.

Here, description is given using FIGS. 9A and 9B regarding processing of the image data using the first correction data. FIG. 9A shows a line buffer constituted by a RAM. In the present embodiment, in the case of a main scanning direction width of 297 mm at 600 dpi, correction data for approximately 7,000 dots is written into the RAM. The correction data according to the present embodiment is constituted by 8 bits for example, and constitutes an offset line buffer 91 for the first correction with a signed binary.

FIG. 9B is a diagram showing the offset line buffer 91 for the first correction.

In FIG. 9B, numeral 92 indicates inputted image data and numeral 91 indicates the offset line buffer for processing the image data here. First, the coordinates information and the offset amount information of the first correction data calculated at step S84 are read into the offset line buffer 91 for the first correction. An offset amount $Y_n$ is set for the coordinates $X_n$ of the offset point, and image data of the position displaced in the sub-scanning direction from the original position by a line number of $Y_n$ is substituted (read out from the displaced position in the memory). As a result, correction bitmap data 93 is generated. In the example of FIG. 9B, an offset point $X_1$ is prescribed to an offset amount $Y_0$=0, and therefore is not offset. However, an offset point $X_2$ is prescribed to an offset amount $Y_2$=−1, and therefore a pixel at the address one pixel unit preceding to the offset point $X_2$ in the sub-scanning direction in the memory is read out. By carrying out this process for each offset point $X_n$, the bitmap data 92 indicating a straight line in the horizontal direction in FIG. 9B is rearranged to an upwardly straight line as shown by the bitmap data 93.

(5) Smoothing Processing

At step S66 in FIG. 6, smoothing processing (second correction) is carried out on the corrected bitmap data that has undergone rearrangement processing in the first correction at step S65. A flow of this processing is described using FIGS. 10A, 10B, and FIG. 12.

Figure 10A:
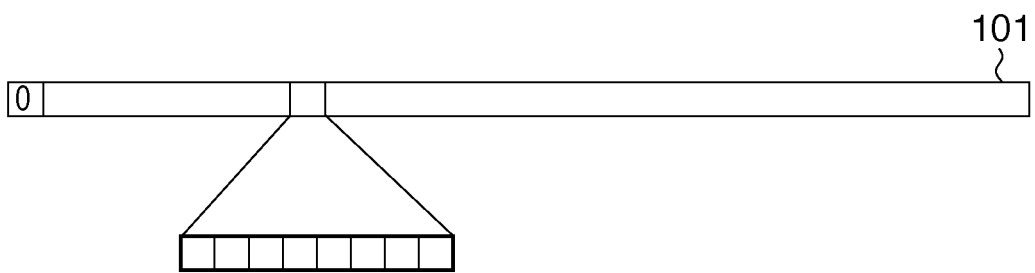
FIG. 10A is a diagram showing a configuration of a buffer memory used in the first correction.

FIG. 10A is a diagram showing a line buffer constituted by a RAM. In the present embodiment, in the case of a main scanning direction width of 297 mm at 600 dpi, correction data for approximately 7,000 dots is written into the RAM. The smoothing data according to the present embodiment is constituted by 8 bits for example, and constitutes a smoothing line buffer 101.

Figure 10B:
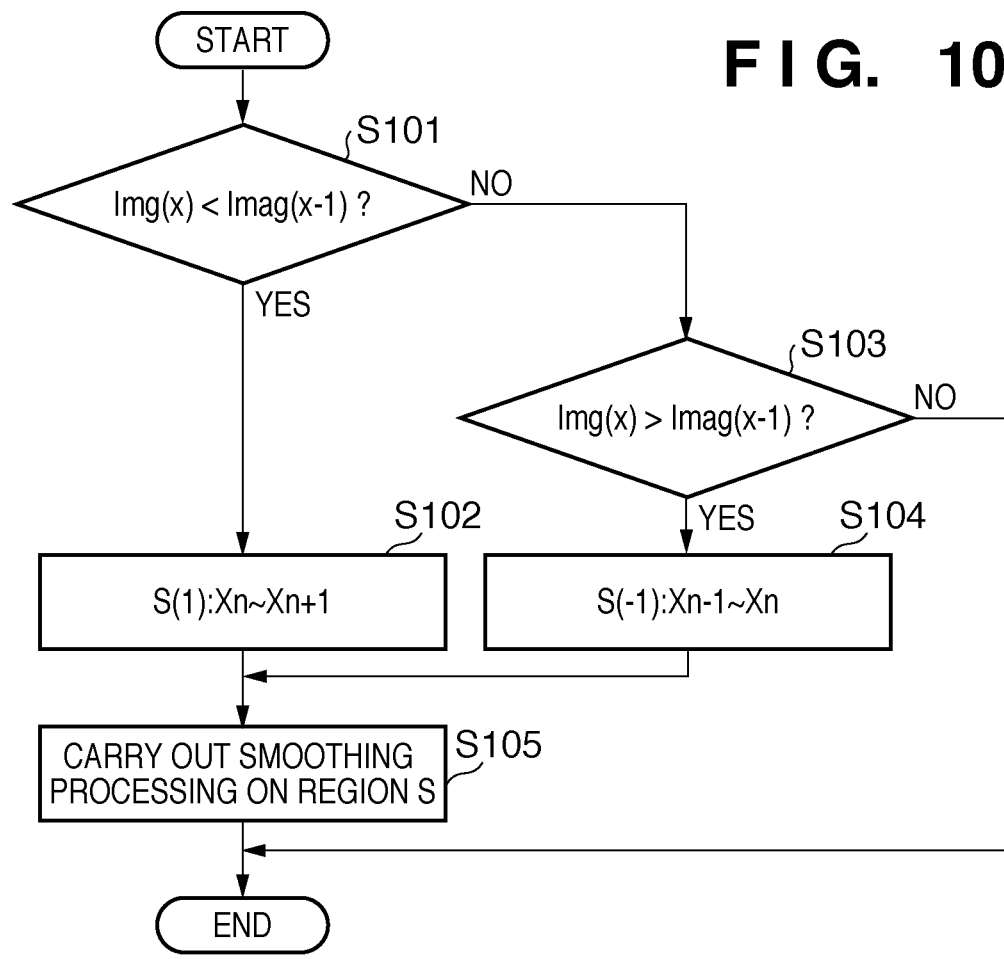
FIG. 10B is a flowchart showing a flow of second correction.

FIG. 10B shows a flowchart of smoothing processing executed by the smoothing processing unit 49. At step S101 in FIG. 10B, a comparison is performed on bitmap data Img(x) of main scanning coordinate x at an offset point $X_n$ of the first correction data calculated at step S84 and bitmap data Img (x−1) of a pixel one pixel preceding thereto in the main scanning direction. When Img(x)<Img (x−1) (a step at the bottom in FIG. 12A), a region of $X_{n+1}$ to $X_n$ between the offset point $X_{n+1}$ and the offset point $X_n$ is set as a smoothing region S(1) at step S102. At step S103, when Img(x)>Img (x−1) (a step at the top in FIG. 12A), a region of $X_{n-1}$ to $X_n$ between the offset point $X_{n-1}$ and the offset point $X_n$ is calculated and set as a smoothing region S(−1) at step S104.

Next, at step S105, smoothing processing is carried out (for example, FIG. 12B) by filling dots of less than one pixel in a white data region (non-imaged region) (Img(x)=0) adjacent to the offset points and the smoothing regions S obtained at steps S102 and S104.

Figure 11:
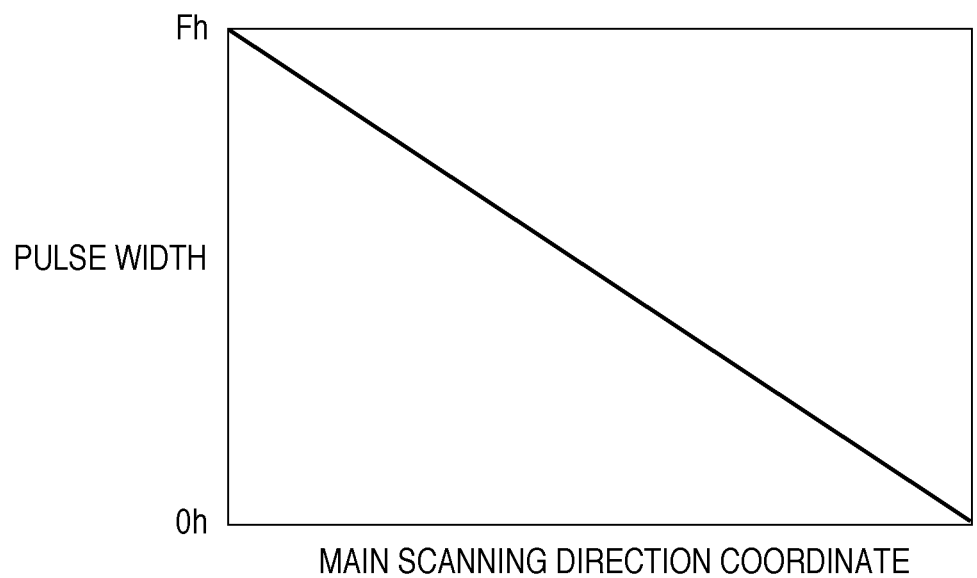
FIG. 11 is a diagram showing a smoothing pattern used in the second correction.

Here, the present embodiment is of a configuration in which pixels are formed using PWM of 16 divisions per pixel, and therefore a configuration is used in which the smoothing processing is carried out using 16 levels corresponding to the pulse widths. FIG. 11 shows a correspondence (exposure amount pattern) between main scanning direction coordinates within the smoothing region S and the pulse widths at those positions. By using a table of the exposure amount pattern shown in FIG. 11, dots of less than one pixel are formed within the smoothing region S. Here, the smoothing processing is carried out for the smoothing regions S(1) by putting the exposure amount pattern in ascending order (changing the pulse widths from large to small) and for the smoothing regions S(−1) by putting the exposure amount pattern in reverse order (changing the pulse widths from small to large). That is, smoothing of the image is carried out by controlling the exposure unit so that dots of a size smaller than one pixel are filled.

It should be noted that the configuration of the smoothing line buffer 101 is the same configuration as the offset line buffer 91, and therefore although the configurations are described separately in the present embodiment, it is in fact possible to use the same line buffer.

When smoothing processing is finished, the image data is sent to the printer at step S67 in FIG. 6.

Overall Flow

Figure 12A:
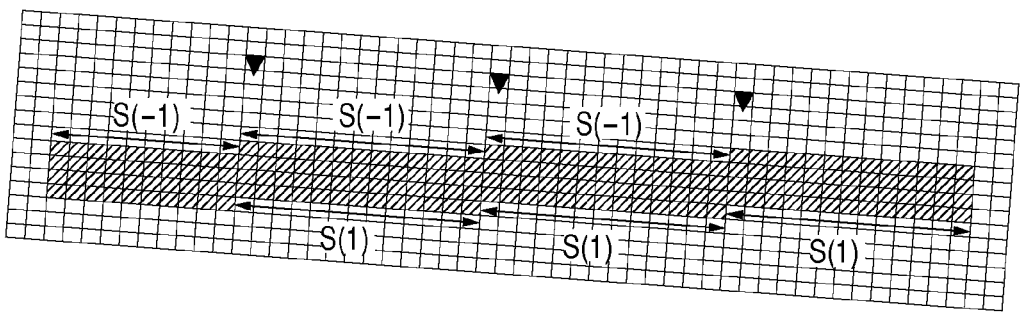
FIG. 12A is a diagram showing an example depiction of correction according to the first embodiment.
Figure 12B:
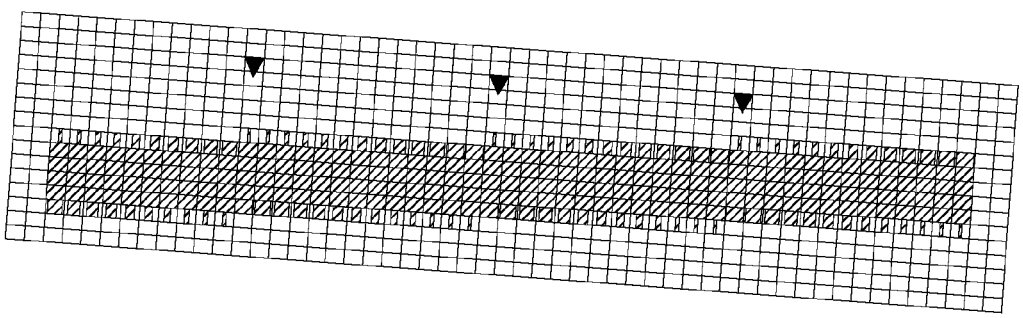
FIG. 12B is a diagram showing an example depiction of the correction according to the first embodiment.
Figure 12C:
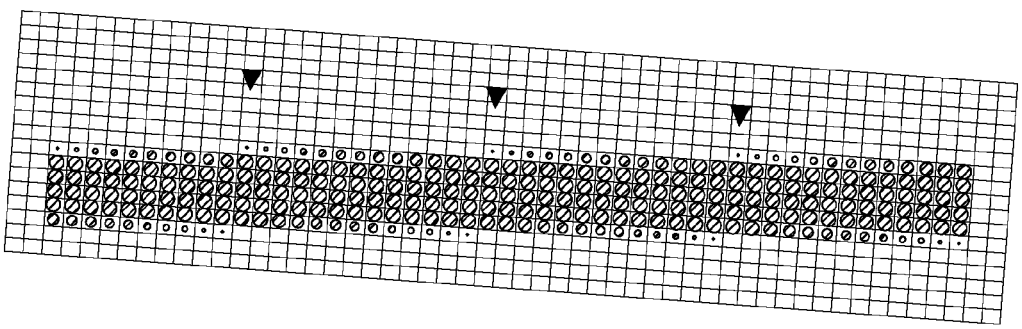
FIG. 12C is a diagram showing an example depiction of the correction according to the first embodiment.
Figure 12D:
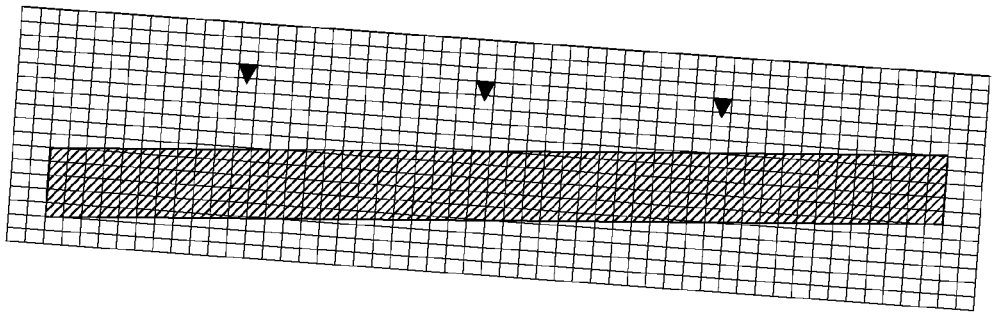
FIG. 12D is a diagram showing an example depiction of the correction according to the first embodiment.

FIGS. 12A to 12D show depictions of the image corrections up to this point. FIG. 12A is a depiction after the first correction, and the depiction shown in FIG. 12B is of when the second correction is carried out on the image of FIG. 12A. When the corrected image data of FIG. 12B undergoes laser exposure, a latent image is formed as in the depiction shown in FIG. 12C, and when image forming is carried out on this latent image, an image as shown in FIG. 12D is obtained as a result. It should be noted that the symbol ▼ in these diagrams indicates the offset points at which the first correction was carried out.

Effect of First Embodiment

As is evident from the above, smoothing processing is executed on regions sandwiched between adjacent offset positions and on white image areas with respect to image data that has been offset in response to a scanning line profile of intrinsic tilt or warp in a laser optical system that has been measured in advance. This enables excellent images to be provided at low cost in which main scanning tilt or main scanning warp has been corrected without using expensive components at the time of assembly or carrying out special fine adjustments.

Second Embodiment

In the first embodiment, smoothing processing was carried out by adjusting the exposure amount. However, with electrophotographic method image forming apparatuses, differences in dot reproducibility may appear even when adjusted to the same exposure amount due to differences in image forming conditions such as environmental conditions such as the ambient temperature and humidity of the image forming unit and deterioration of the developing material. Particularly when forming dots of less than one pixel, there is a large concern that dot reproduction will fluctuate undesirably due to environmental conditions including at least one of ambient temperature or humidity of the image forming unit or deterioration of the developing material or the like. Accordingly, in the present embodiment, control is performed so that stable smoothing processing results can be obtained by taking into consideration image forming conditions when carrying out smoothing processing using microdots in this manner.

With the present embodiment, an example application is illustrated of the smoothing processing of step S66 in the flowchart of FIG. 6 with which the first embodiment was described. FIG. 13 shows a flowchart of smoothing processing according to the present embodiment. At step S131, a comparison is performed on bitmap data Img(x) of main scanning coordinate x at an offset point $X_n$ of the first correction data calculated at step S94 and bitmap data Img(x−1) of coordinate x−1 immediately preceding thereto in the main scanning direction. When Img(x)<Img (x−1), a region of $X_{n+1}$ to $X_n$ between the next offset point $X_{n+1}$ and the offset point $X_n$ is set as a smoothing region S(1) at step S132. If Img(x)>Img (x−1) at step S133, a region of $X_{n-1}$ to $X_n$ between the preceding offset point $X_{n-1}$ and the offset point $X_n$ is set as a smoothing region S(−1) at step S134.

At step S104 in the first embodiment, an image for smoothing was formed by using dots of less than one pixel in the smoothing regions S, and at that time smoothing processing was carried out by forming dots of less than one pixel in the range of the smoothing regions S by using the exposure amount pattern shown in FIG. 11.

Figure 14:
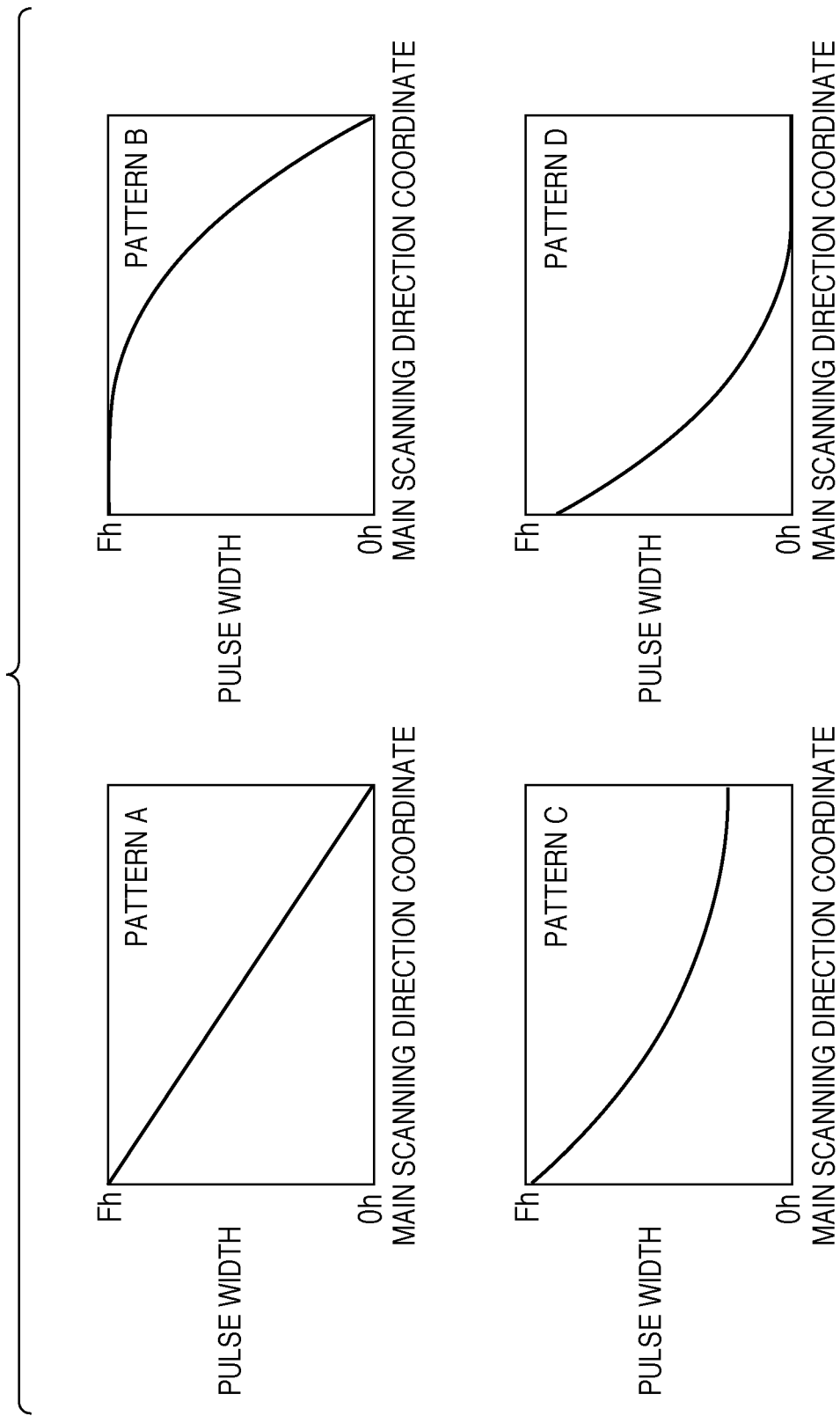
FIG. 14 is a diagram showing a plurality of smoothing patterns used in the second correction according to the second embodiment.

In contrast to this, the present embodiment is configured to hold in advance a plurality of exposure amount patterns as shown in FIG. 14. Then at step S135, based on an environmental condition obtained from an environment sensor or the number of sheets subjected to transfer obtained from a sheet counter of the process cartridge, an optimal pattern is selected from among the plurality of smoothing patterns as shown in FIG. 14. Other than this, the configuration is the same as the first embodiment.

With the present embodiment, it is possible form an excellent image by correcting tilt or warp in a same manner as the first embodiment for a laser optical system whose scanning line profile has a tilt or warp. And in a case where the image forming apparatus fluctuates due to environment conditions or durability conditions or the like, the results of smoothing processing can be optimized to match the fluctuation, and therefore an excellent image can be provided.

Other Embodiments

Detailed description has been given above concerning embodiments of the present invention, but the present invention may also be applied to a system constituted by a plurality of instruments, and may be applied to a device constituted by a single instrument.

It should be noted that the present invention may also be accomplished by supplying a control program that achieves the functions of the foregoing embodiments directly or remotely to a system or a device, and having a processor of the system or device read out and execute the supplied program code. Consequently, the actual program code to be installed on a computer to achieve the functional processing of the present invention on the computer is included in the technical scope of the present invention.

In this case, as long as the functionality of the control program is present, the form of the program is of no concern and may be object code, a program to be executed by an interpreter, or script data or the like supplied to an OS.

Examples of recording media for providing the control program include a floppy (registered trademark) disk, a hard disk, an optical disk, and a magneto-optical disk. Other examples include MO, CD-ROM, CD-R, CD-RW, magnetic tape, nonvolatile memory cards, ROM, DVD (DVD-ROM, DVD-R) and the like.

Other methods to use the control program also include connecting to a website on the Internet using a browser on a client PC and downloading to a recording medium such as a hard disk or the like an actual program according to the present invention or a file further including automatic installation functionality. Furthermore, it is also possible to achieve the invention by having the program code that constitutes a program of the present invention divided into a plurality of files and downloading the respective files from different websites. That is, a WWW server that enables a plurality of users to download the program for achieving the functional processing of the present invention on a computer is also included within the scope of the present invention. Furthermore, a program according to the present invention may also be encrypted and stored on a storage medium such as a CD-ROM for distribution to users. The invention can also be achieved by allowing a user who meets a predetermined condition to download from a website via the Internet information of a key that unlocks the encryption and to then execute the encrypted program by using the key information and installing the program on a computer.

Furthermore, an OS or the like that runs on a computer may carry out a part or all of the actual processing according to instructions of the program such that the functionality of the foregoing embodiments is achievable by the processing thereof.

Further still, the scope of the present invention also includes a case where a program according to the present invention is written into a memory provided in a functionality expansion unit of a PC and a CPU or the like provided in the functionality expansion unit executes a part or all of the actual processing according to the program.

With the present invention, high image quality image forming can be achieved without carrying out corrections using expensive optical components or precise fine adjustments at the time of assembly on the tilt or warp or the like of scanning lines of the optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-207179 filed on Aug. 8, 2007, which is hereby incorporated by reference herein in its entirety.

What is claimed is:

1. An image forming apparatus comprising:
an image carrier configured to carry an electrostatic latent image;
a charging unit configured to charge a surface of the image carrier;
an exposure unit configured to irradiate light onto the charged surface of the image carrier to form the electrostatic latent image;
a developing unit configured to develop the electrostatic latent image formed on the surface of the image carrier using a developing material;
a transfer unit configured to transfer a developer image formed on the surface of the image carrier onto a printing material;
a storage unit configured to store a plurality of smoothing pattern tables, each of which includes exposure amounts for respective positions in a smoothing region and in a main scanning direction of the exposure unit;
a selecting unit configured to select a smoothing pattern table from among the plurality of smoothing pattern tables stored in the storage unit in accordance with an image forming condition;
an image correction unit configured to shift image data in a sub-scanning direction of the exposure unit at a plurality of offset positions in the main scanning direction to correct deformation of a scanning line of the light irradiated by the exposure unit; and
a smoothing processing unit configured to add a dot whose size is smaller than one pixel in a white image region which is a region between the offset positions and is adjacent to the shifted image data in the sub-scanning direction based on the selected smoothing pattern table,
wherein the smoothing processing unit is configured to reverse an order of a pattern read out from the selected smoothing pattern for smoothing processing, depending on a position of image data that indicates that a dot is to be formed and is adjacent to the white image region in the main scanning direction.

2. The image forming apparatus according to claim 1, wherein
wherein the smoothing processing unit is configured to add a dot which becomes smaller depending on a distance from one of the offset positions.

3. The image forming apparatus according to claim 1, wherein the image forming condition is at least one of an ambient temperature or humidity of a developing unit.

4. The image forming apparatus according to claim 1, wherein the image forming condition is the number of sheets subjected to transferring performed by the transfer unit.

5. A control method for controlling an image forming apparatus comprising an image carrier configured to carry an electrostatic latent image, a charging unit configured to charge a surface of the image carrier, an exposure unit configured to irradiate light onto the charged surface of the image carrier to form the electrostatic latent image, a developing unit configured to develop the electrostatic latent image formed on the surface of the image carrier using a developing material, a transfer unit configured to transfer a developer image formed on the surface of the image carrier onto a printing material, and a storage unit configured to store a plurality of smoothing pattern tables,
the control method comprising the steps of:
selecting in which a smoothing pattern table is selected from among the plurality of smoothing pattern tables stored in the storage unit in accordance with an image forming condition, each of the plurality of smoothing pattern tables including exposure amounts for respective positions in a smoothing region and in a main scanning direction of the exposure unit;
image correcting in which image data is shifted in a sub-scanning direction of the exposure unit at a plurality of offset positions in the main scanning direction to correct deformation of a scanning line of the light irradiated by the exposure unit; and
smoothing processing in which a dot whose size is smaller than one pixel is added in a white image region which is a region between the offset positions and is adjacent to the shifted image data in the sub-scanning direction based on the selected smoothing pattern table,
wherein the smoothing processing includes reversing an order of a pattern read out from the selected smoothing pattern, depending on a position of image data that indicates that a dot is to be formed and is adjacent to the white image region in the main scanning direction.

6. A non-transitory computer-readable storage medium storing a computer-executable program for controlling an image forming apparatus comprising an image carrier configured to carry an electrostatic latent image, a charging unit configured to charge a surface of the image carrier, an exposure unit configured to irradiate light onto the charged surface of the image carrier to form the electrostatic latent image, a developing unit configured to develop the electrostatic latent image formed on the surface of the image carrier using a developing material, a transfer unit configured to transfer a developer image formed on the surface of the image carrier onto a printing material, and a storage unit configured to store a plurality of smoothing pattern tables, wherein the computer-executable program comprises:
selecting instructions configured to select a smoothing pattern table from among the plurality of smoothing pattern tables stored in the storage unit in accordance with an image forming condition, each of the plurality of smoothing pattern tables including exposure amounts for respective positions in a smoothing region and in a main scanning direction of the exposure unit;
image correcting instructions configured to shift image data in a sub-scanning direction of the exposure unit at a plurality of offset positions in the main scanning direction to correct deformation of a scanning line of the light irradiated by the exposure unit; and
smoothing processing instructions configured to add a dot, whose size is smaller than one pixel, in a white image region which is a region between the offset positions and is adjacent to the shifted image data in the sub-scanning direction based on the selected smoothing pattern table,
wherein the smoothing processing instructions are configured to reverse an order of a pattern read out from the selected smoothing pattern for smoothing processing, depending on a position of image data that indicates that a dot is to be formed and is adjacent to the white image region in the main scanning direction.

* * * * *